ADJUSTABLE HOLDER PARTICULARLY USEFUL FOR MOUNTING MAGNETIC HEADS

The present invention relates to an adjustable holder for a device permitting its adjustment in a plurality of directions with respect to a reference line. The invention is particularly useful for mounting magnetic heads to permit their adjustment for both centering (lateral deviation) and skew (angular deviation) with respect to the center line of a recording track, and it is therefore described below in connection with such application.

For a magnetic head to be properly adjusted with respect to the recording track, the center point of the gap in the head should be exactly aligned with the center line of the recording track (i.e., zero lateral deviation), and the gap in the magnetic head should be exactly at right angles to the recording track center line (i.e. zero skew). Many arrangements have been devised for effecting these adjustments of magnetic heads. In many of the known arrangements, however, making a lateral adjustment affects the skew, and vice versa, so that precise adjustment may require a number of manipulations and considerable skill by the operator. Other known arrangements involve complicated and expensive mounting structures and/or complicated procedures for effecting the adjustments. Further, in many of the known arrangements, removing and replacing the head or its holder requires readjustment for centering or skew.

According to the present invention, there is provided an adjustable holder for a device permitting its adjustment for centering and skew with respect to a reference line, comprising: a supporting member for supporting the device; a mounting member; attaching means attaching the supporting member to the mounting member while permitting relative displacement therebetween; each of said members including first, second, and third mutually-engaging coupling elements having axes located to define the corners of a triangle having at least two equal sides, and a center-line passing through the axis of the first coupling element and mid-way between the axes of the second and third coupling elements; and two triangles defined by the coupling element axes of the two members being similar, non-congruent triangles having common center-lines, the coupling elements of one member being fixed and the coupling elements of the other member being rotatable about their respective axes and engaging the fixed coupling elements to effect a relative displacement between the respective members; said rotatable coupling elements having means constraining the relative displacement of the engaging fixed coupling elements to rectilinear paths, with the displacement path of the first coupling elements being substantially in parallel to the common center-line of the two triangles, and the displacement paths of the second and third coupling elements being at substantially equal angles to said common center-line; whereby rotating the first rotatable coupling element effects skew adjustment of the device with respect to the reference line, and rotating the second and third rotatable coupling elements in equal and opposite directions effects centering adjustment of the device with respect to the reference line.

In the preferred embodiment of the invention described below, the axes of the three coupling elements of the two members define the corners of two equilateral triangles having concentric pitch circles of unequal diameters, the center-point of the device to be adjusted with respect to the reference line being substantially on the pitch circle diametral line drawn through the axis of the first coupling element on said supporting member.

According to a more specific aspect of the invention, there is provided an adjustable holder for a device permitting its adjustment for centering and skew with respect to a reference line, comprising: a supporting member for supporting the device; a mounting member; attaching means attaching the supporting member to the mounting member while permitting relative displacement therebetween; each of said members including first, second and third mutually-engaging coupling elements having axes located to define the corners of an equilateral triangle, the triangles of the coupling elements of the two members being on concentric pitch circles of unequal diameters; the coupling elements of one member being fixed, and the coupling elements of the other member being rotatable about their respective axes and engaging the fixed coupling elements to effect a relative displacement between the respective members; the center-point of the device to be adjusted with respect to the reference line being on the pitch circle diametral line drawn through the axis of the first coupling element on said supporting member; said rotatable coupling elements having means constraining the relative displacement of the engaging fixed coupling elements to rectilinear paths with the displacement path of the first coupling elements being substantially parallel to the center-line of the pitch circle of the fixed coupling elements, and the displacement paths of the second and third coupling elements being substantially at right angles to lines drawn from the axes of the second and third fixed coupling elements tangent to their respective pitch circle; whereby rotating the first rotatable coupling element effects skew adjustment of the device with respect to the reference line, and rotating the second and third rotatable coupling elements in equal and opposite directions effects centering adjustment of the device with respect to the reference line.

Preferably, the center point of the device to be adjusted is substantially at the intersection point of said lines drawn through the axes of the second and third fixed coupling elements tangent to their respective pitch circle. In such an arrangement, skew adjustments may be effected without changing lateral positioning, and vice versa. Also, the removal of the head supporting member, e.g., for replacement of the head, does not require re-adjustment for centering or skew.

In the preferred embodiment of the invention described below, the rotatable coupling elements are carried by the supporting member, and the fixed coupling elements are carried by the mounting member.

The invention is described below particularly for use in mounting magnetic heads to permit lateral and skew adjustment with respect to the center line of the recording track.

Further features and advantages of the invention will be apparent from the description below.

The invention is herein described, by way of example only, with reference to the accompanying drawings, wherein:

FIG. 1 is a front elevational view of an adjustable magnetic head mounting constructed in accordance with the invention;

FIG. 2 is a side elevational view of the adjustable mounting of FIG. 1, and FIG. 2a is a fragmentary view from the opposite side thereof;

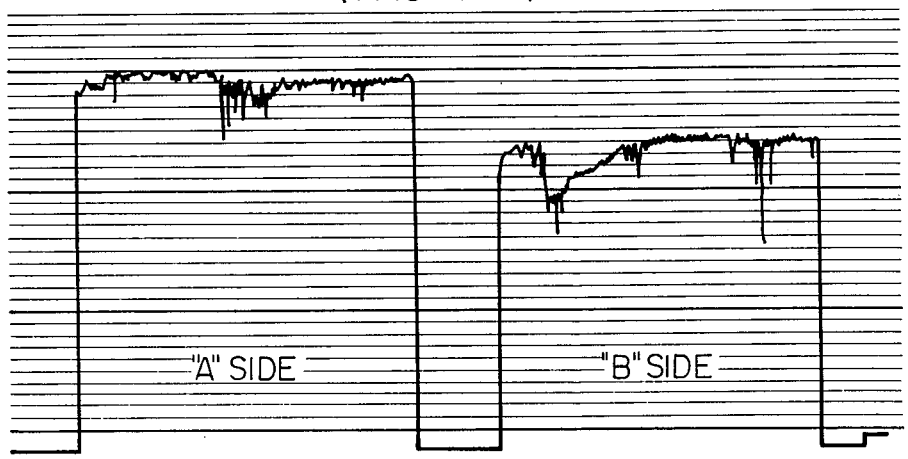
Fig. 4
(PRIOR ART)
"A" SIDE  "B" SIDE
Fig. 5B
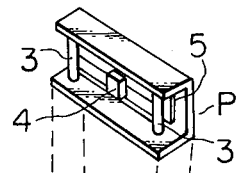
Fig. 5A
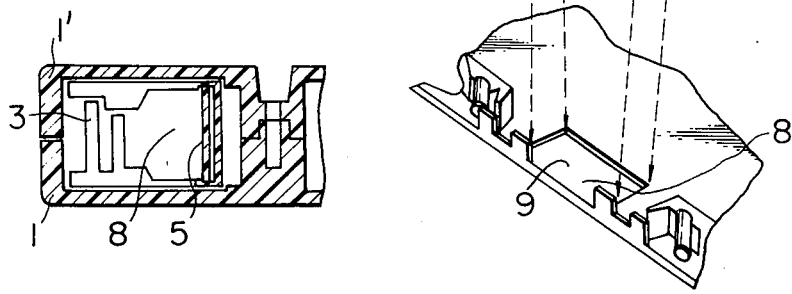

MAGNETIC TAPE CASSETTE

BACKGROUND AND BRIEF DESCRIPTION OF THE INVENTION

The present invention relates to magnetic tape cassettes for use in presently avilable tape cassette recorders. More particularly, this invention provides an improved tape cassette which has excellent operating and recording and playback characteristics.

The conventional tape cassette includes two hubs or spools of tape wound on rotatably mounted cores adapted to be driven by drive spindles on tape recorders adapted to receive such a cassette.

The cassette housing, usually in the form of two shells or trays which are sealed together to form a generally flat rectangular compartment, has various openings to enable cooperation of the recorder with the tape in the cassette, for example, tape heads for record, playback (reproducing), erase, and the tape drive mechanism.

The housing of tape cassettes in general have a window provided in the front housing wall for admitting the recording - reproducing head, and at each side of this window is located a pin, integral with the housing, to restrict the position of the magnetic tape. Behind these two pins are provided a pressure assembly comprising a head pressure pad and a shield plate. The cassette includes roller posts and various other guide members defining the path of the tape from one spool past the various openings in the cassette housing to the other spool. With this arrangement of essential elements associated with that portion of the magnetic tape coming into running contact with the head, the tape in motion is compelled to move through a given path. Thus, the running mode of the tape in the window section relative to the magnetic head is determined by the shapes of the two cassette housing halves and is dependent upon the precision with the housing is fabricated. Because of the variations in "identical" cassette housings, due to production tolerances, the tape moving through the magnetic head section of the cassette is biased to one side of the tape path. There is accordingly some difference in sensitivity between the two tracks, "A" side and "B" side, of the tape.

SUMMARY OF THE INVENTION

It is an object of this invention to overcome the disdavantages of conventional tape cassettes, and particularly to provide a cassette having an improved pressure assembly for the magnetic head to reduce variations in recording and playback performance between tracks of the tape and to improve tape running characteristics.

In a cassette according to this invention, the magnetic head pressure assembly is not fixed but is held movable in place, so that, when the tape is running in operation, no force acts on it to displace it toward one side. In other words, the tape in sliding contact with the magnetic head remaims evenly pressed and, consequently, there occurs no difference in sensitivity between different tracks of the tape.

BRIEF DESCRIPTION OF THE DRAWING

FIG. 4 is a chart of output sensitivity of a conventional tape cassette.

FIG. 5A is a sectional view showing a first embodiment of the invention.

FIG. 5B is a partially exploded perspective view showing the first embodiment of the present invention.

DETAILED DESCRIPTION

Figure 1:
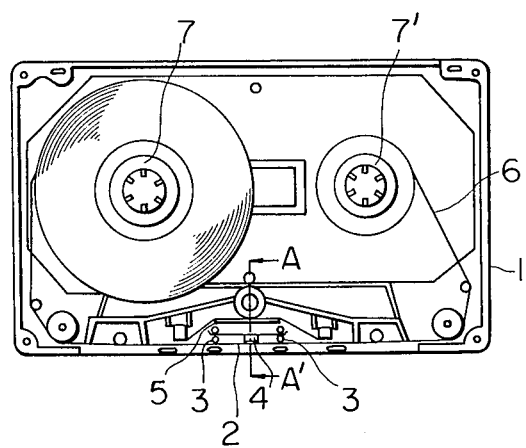
FIG. 1 is a plan view of the bottom half of a conventional tape cassette, from which the top half has been removed to expose the interior.
Figure 2:
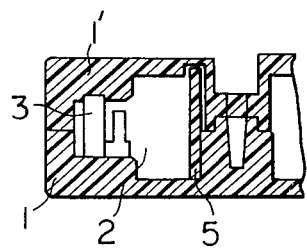
FIG. 2 is a partially sectional view, taken at plane A — A' of FIG. 1, of the two cassette halves put together.

Referring now in detail to the drawing, FIG. 1 shows the bottom half 1 of a conventional cassette, from which the top half 1' has been removed to expose the interior. FIG. 2 indicates the cross-section, taken at plane A — A' of FIG. 1, of two cassette halves put together.

Figure 3:
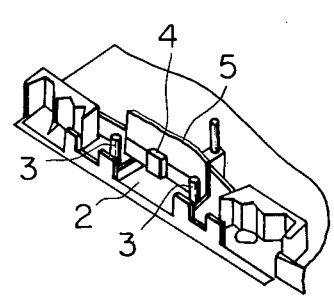
FIG. 3 is a perspective view of a part of the tape cassette of FIG. 1.

FIG. 3 shows window 2, pressure pad 4, tape positioning pins 3, and shield plate 5 in a perspective view. From these views of FIGS. 1 through 3, it will be seen that a conventional cassette construction is characterized by the positioning pins 3 being integral with the half case 1 and standing at both sides of window 2 formed of the front wall for admitting the magnetic head (not shown), and also by the pressure pad 4 and shield plate 5 being located behind the pins.

While this arrangement of essential elements associated with that portion of the record medium or magnetic tape 6 coming into running contact with the magnetic head, the tape in motion from hub 7 to hub 7' is compelled to move through a given path. Thus, the position of running tape 6 in the window section relative to the magnetic head is determined by the shapes of the two cassette housing halves 1, 1', and is dependent upon the precision with which the housing is fabricated. As noted above, the housing consists of two halves 1, 1', which are shaped by molding a plastic material, and are joined together to form the housing. More or less variations in dimensions and shape, however small they may be, of identical cassette housings constituting a production lot is inevitable, simply because there are limits on the degree of precision attainable in the molding and joining of the two housing halves.

By reason of such variation, the tape moving through the magnetic head section of the cassette must be expected to be always to one side of tape movment. Stated specifically, the tape in that section remains displaced to one side relative to the magnetic head in contact therewith. When a cassette with such a tape is set in a recording or playback machine, there is bound to occur some difference in terms of intensity of the magnetic record on the tape or of playback output sensitivity between the two tracks, namely the "A" and "B" sides of the tape as demonstrated in FIG. 4. In FIG. 4, the difference of output sensitivity between the "A" and "B" sides of the tape resulted in about 8 dB at the measuring frequency of 10 KHz. This is a drawback of conventional tape cassettes, to the overcoming of which the present invention is directed.

The first preferred embodiment of this invention is shown in FIGS. 5A and 5B, wherein numbered parts 3, 4 and 5 correspond respectively to those similarly numbered in FIGS. 1 through 3. Pressure assembly P, in which the magnetic tape 6 comes into sliding contact with the magnetic head (not shown), comprises pins 3, pad 4 and shield plate 5 mounted together as a unit. Tape transport section 8, formed of the half case 1 has recess 9, and it is in this recess or pocket that the assembly P is movably held. Since pressure assembly P is movable in place, a running tape in that assembly complies with and conforms to the tilt of the magnetic head.

Figure 6:
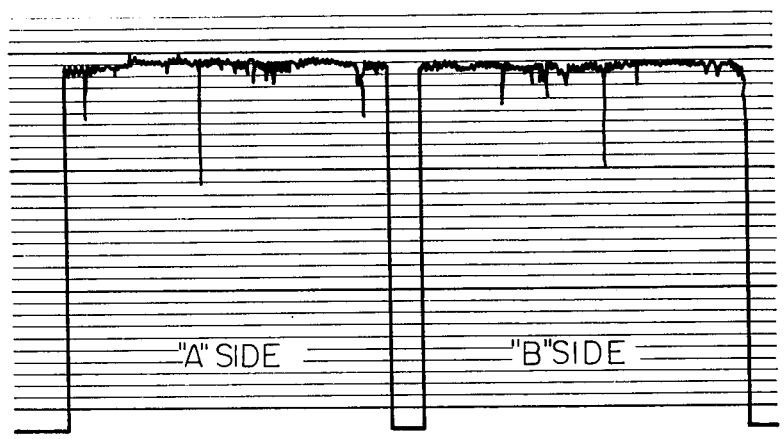
FIG. 6 is a chart of output sensitivity of a tape cassette according to the first embodiment of this invention.

Pressure assembly P is sandwiched in place by two split halves, i.e., an upper half case 1' and a bottom case 1, of tape transport section 8, so that it is incapable of leaving recess 9, although it is movable in place. The compliance and conformance of pressure assembly P to a tilted magnetic head results in improved sliding contact between tape and head. Consequently, the aforementioned variations in housing shape and dimension diminish so much as to make the "A" side and "B" side present almost the same output sensitivity to the playback machine, as demonstrated by FIG. 6.

Figure 7:
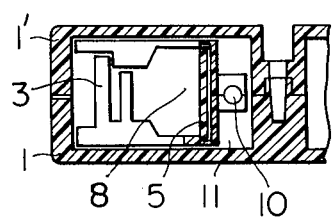
FIG. 7 is a sectional view showing a second embodiment of the present invention.
Figure 8:
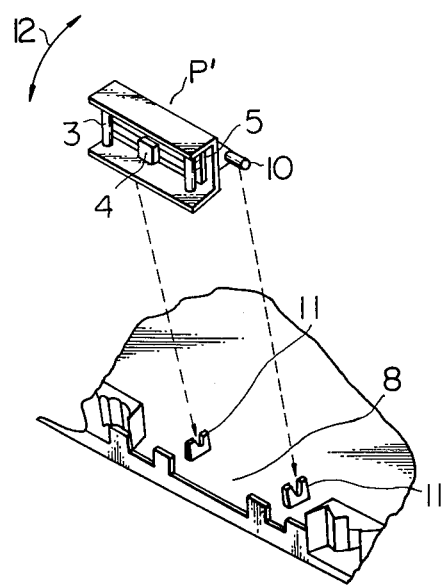
FIG. 8 is a partially exploded perspective view of the structure of FIG. 7.

FIG. 7 shows a second embodiment of this invention. FIG. 8 indicates the major elements shown in FIG. 7 in an exploded view. In these figures it will be noted that assembly P' includes a round rod or protrusion 10 protruding sideways. This rod is shaped and located so as to be properly supported by supports 11 provided in tape transport section 8, and the pressure assembly P' is capable of freely pivoting in the direction of the arrow 12. This structural arrangement enables pressure assembly P' to comply with and conform to the tilt of the magnetic head, thereby improving the sliding contact between running tape and magnetic head, thus eliminating the aforementioned difference in output sensitivity between the "A" and "B" sides of the tape.

It will be noted from the foregoing description that, according to this invention, that portion of the cassette bringing the tape into sliding contact with the magnetic head is made freely movable or tiltable in place. By this feature, representing a distinct departure from a conventional tape cassette, this invention eliminates the uneven sliding contact, inevitable hitherto in conventional tape cassettes, between the running tape and the magnetic head due to the tilt of the head.

The present invention has been described in detail with particular reference to the preferred embodiments thereof, but it will be understood that variations and modifications can be effected within the spirit and scope of the invention, which is to be taken to be defined by the following claims.

What is claimed:

1. In a cassette carrying a record medium, a unitary pressure pad assembly for placing said record medium into sliding contact with a magnetic head, said unitary pressure pad assembly including pin means for positioning the record medium and pressure pad means for urging the record medium against said magnetic head, the improvement wherein said cassette includes support means for retaining said unitary pressure pad assembly in place while allowing pivotal movement about an axis parallel to the longitudinal direction of movement of the record medium.

2. An improved cassette according to claim 1, wherein said support means includes a recess formed in a portion of said cassette, and said support means allows free movement of said unitary pressure pad assembly toward and away from said record medium and transverse thereto.

3. An improved cassette according to claim 1, wherein said unitary pressure pad assembly includes a sidewise protrusion, and said support means pivotally carries said protrusion providing said pivotal movement of said unitary pressure pad assembly.

4. An improved cassette according to claim 3, wherein said protrusion comprises a rod.

* * * * *